May 26, 1942. H. DIAMOND ET AL 2,283,919
ART OF RADIOMETEOROGRAPHY
Filed May 4, 1938 3 Sheets-Sheet 1

INVENTORS
Harry Diamond,
Wilbur S. Hinman, Jr.
ATTORNEY

May 26, 1942.  H. DIAMOND ET AL  2,283,919
ART OF RADIOMETEOROGRAPHY
Filed May 4, 1938  3 Sheets-Sheet 3

INVENTORS
Harry Diamond,
Wilbur S. Hinman, Jr.,
by J. F. Mothershead
ATTORNEY

Patented May 26, 1942

2,283,919

UNITED STATES PATENT OFFICE 2,283,919

ART OF RADIOMETEOROGRAPHY

Harry Diamond, Washington, D. C., and Wilbur S. Hinman, Jr., Falls Church, Va., assignors to the Government of the United States, as represented by the Secretary of Commerce Application May 4, 1938, Serial No. 206,086

21 Claims. (Cl. 73—151)

(Granted under the act of March 3, 1883, as amended April 30, 1928; 370 O. G. 757)

The invention described herein may be made and used by and for the Government of the United States for governmental purposes without the payment to us of any royalty therefor.

This invention relates to radiometeorograph systems and aims generally to improve the same.

The complete radio meteorograph system consists of transmitting and instrumental means for sending down from unmanned balloons meteorological observations on upper-air pressure, temperature, humidity, or other phenomena; receiving and recording equipment on the ground for automatically plotting such data in the graphical form desired by meteorologists or rendering it available in any other form; and direction finding means (also at the ground station) for tracking the flight of the balloon so as to determine upper-air wind conditions.

The balloon instrument in the embodiment herein described for purposes of illustrating our invention consists of a radio transmitting unit, a battery unit, and a meteorograph unit. The latter contains the elements which vary in accordance with barometric pressure, temperature and humidity, as representative of any factor which it is desired to determine. In one form of this instrument, for example, means are also provided for the measurement of light intensity, thereby giving data on the height and vertical structure of existing cloud formations.

The complete instrument may be contained in a light weight, for example, balsa-wood container, which may advantageously be provided with separate compartments for each of the three units above designated. The total weight may be kept very small, as low, for example, as 1¾ pounds. The radio transmitter may employ three tubes of the 2-volt filament type, one serving as a special audio oscillator, the second as an audio amplifier, and the third as an ultra high frequency oscillator. The meteorograph unit is electrically connected to the audio oscillator. Light-weight batteries of any suitable or special form may be used to provide sufficient power for efficient operation of the transmitter over the normal period of flight, say two hours or so, under flight conditions.

In the accompanying drawings of preferred embodiments of apparatus and circuit arrangements in accordance with and illustrative of the structure and method of this invention.

Photographs of actual embodiments of the invention are contained in publications made by the inventors and their associates within two years prior to the filing of the present application, and hereinafter identified.

In the system of this invention various carrier frequencies may be used and actual use has been made of frequencies ranging up to 200 megacycles per second. A typical transmitter may employ, for example, a carrier frequency of about 50 megacycles per second and feed its power into a half-wave transmitting antenna. Satisfactory records have been obtained from this type of transmitter with the balloon carried away by upper-air winds to distances of the order of 150 miles from the ground station.

An instrument embodying the method and means of this invention may be simply and cheaply constructed; may be made very light in weight and may provide pressure indications of much greater accuracy than heretofore obtained, for example, within one millibar of accuracy over a range of from 1000 to 100 or less millibars pressure. It may similarly provide great accuracy in temperature indication, for example within 1° centigrade over a range of from +40° to −75° C., this accuracy being limited for the most part only by the accuracy of the temperature responsive device employed. Likewise, great accuracy of indication of humidity may be obtained, limited for the most part only by the accuracy of the humidity responsive device. Accuracy within 3% from 0% to 100% relative humidity has been obtained.

In addition, in accordance with this invention, emitted signals suitable for use by radio direction finders on the ground, as signals of continuous carrier characteristic, are provided.

Most former radiometeorographs used clockworks, fans, electric motors, or some similar extraneous means for switching the radio transmitter, usually involving interruption or shift of radio frequency of the carrier, rendering it, for practical purposes, nearly useless for direction finding and difficult to maintain continuous reception of the signals. The present invention obviates the need of such extraneous means, employs one of the meteorological factors to effect the switching, and enables a continuous radio frequency carrier to be employed, thus facilitating continuous reception of the signals for all purposes.

In the illustrative embodiment shown in the drawings advantage is taken of the fact that the barometric pressure element deflects continuously in one direction as the balloon ascends. A pointer actuated by the pressure diaphragm moves over a simple switching element which consists of alternating conducting and insulating segments. As the arm moves over these segments it performs the necessary switching operations. The face of the switching element is polished so that friction opposing the arm movement is negligible. Hence, the sequence of switching operations also serves to mark definite values of pressure on an absolute scale. Selected members, as successive fifth conducting segments of the switching element, for example, provide positive identification of the portion of the pressure range which is being indicated. How these identifying contacts function and also the manner in which the temperature and humidity indications are given are hereinafter described.

Figures 1, 2, 9, 10:
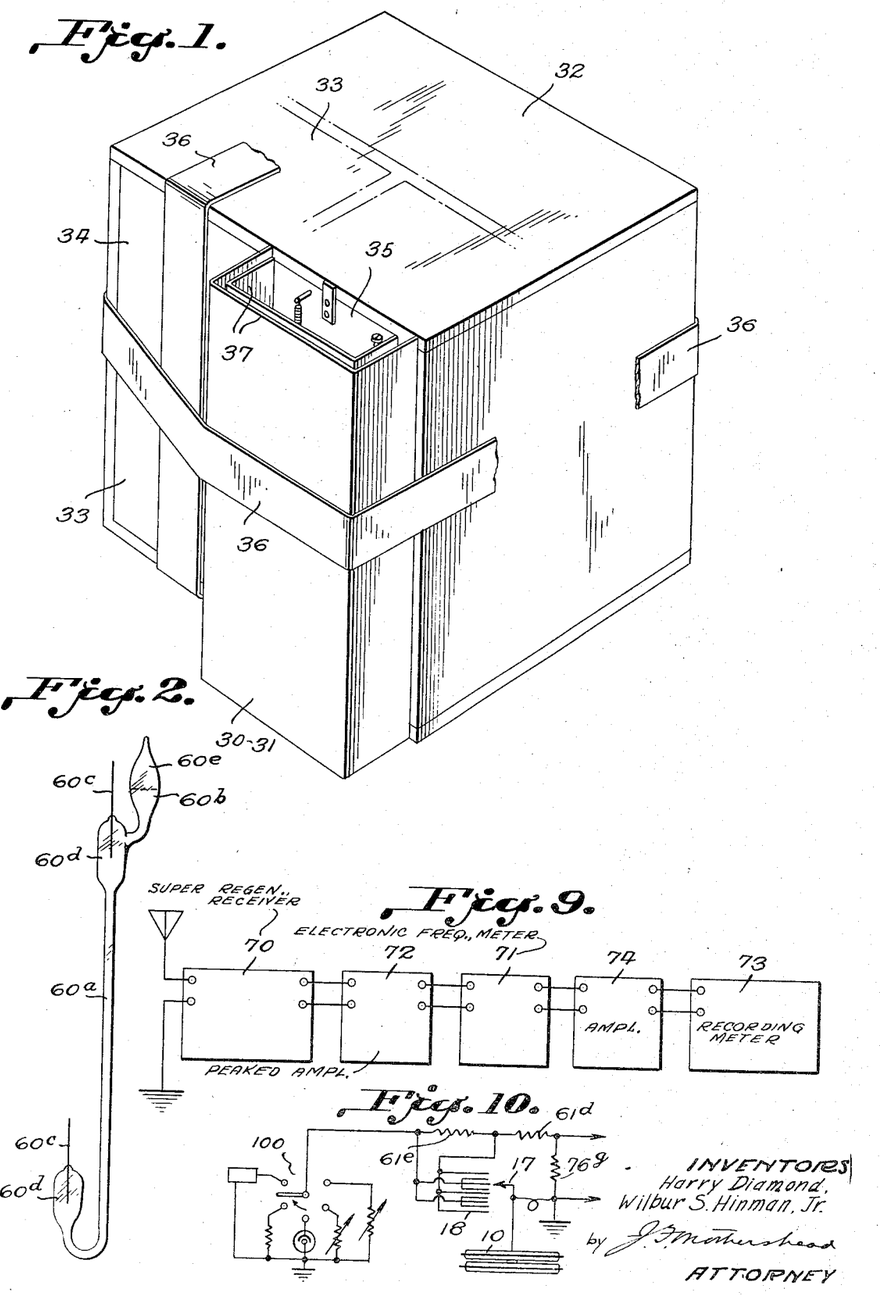
Fig. 1 is an external view of an assembled radiometeorograph balloon instrument.
Fig. 2 illustrates a preferred form of temperature responsive resistance device.
Fig. 9 is a diagrammatic representation of suitable ground station equipment for obtaining a record of the type illustrated in Fig. 8.
Fig. 10 shows diagrammatically another modified arrangement of the balloon instrument.

The pressure-switching method and arrangement of this invention affords several important advantages over other types of meteorographs: (1) it provides absolute readings of that meteorological element which requires the greatest precision of measurement, i. e. the barometric pressure; (2) by dispensing with the need for auxiliary motive power for switching it makes possible a very simple and inexpensive meteorograph unit, a most desirable feature if the radio meteorograph is to replace the use of airplanes in this service; (3) the number of observations obtained during an ascent becomes independent of the rate of ascent of the balloon. Hence, a high rate of ascent may be used in order to reduce the total time required for taking a complete set of observations. To take full advantage of high rate of ascent, it is desirable that a special temperature device be incorporated in the meteorograph which can respond much faster to temperature changes than the conventional bi-metallic thermometer. Such a device is shown in Fig. 2. It consists of a small capillary tube (hereinafter more fully described) filled with a material whose resistance varies with temperature, such as a sulphuric acid solution of, say, 1.3 specific gravity. The resistance of this capillary column changes markedly with temperature and serves to change the transmitted signal in a manner which will be explained later. Humidity indication may be obtained by use of a hair hygrometer-controlled variable resistor modifying the modulation frequency of the transmitter as herein diagrammatically shown for purposes of illustration, or any other device responsive to humidity and operable inherently or by control of other elements, to correspondingly vary the signal characteristics, may be employed. (4) The record which may be provided at the ground station with this method may automatically plot temperature and humidity as abscissas against pressure as ordinates, a form of graph preferred by meteorologists.

*Preferred structure of switching elements*

Figures 3, 3A, 5, 8:
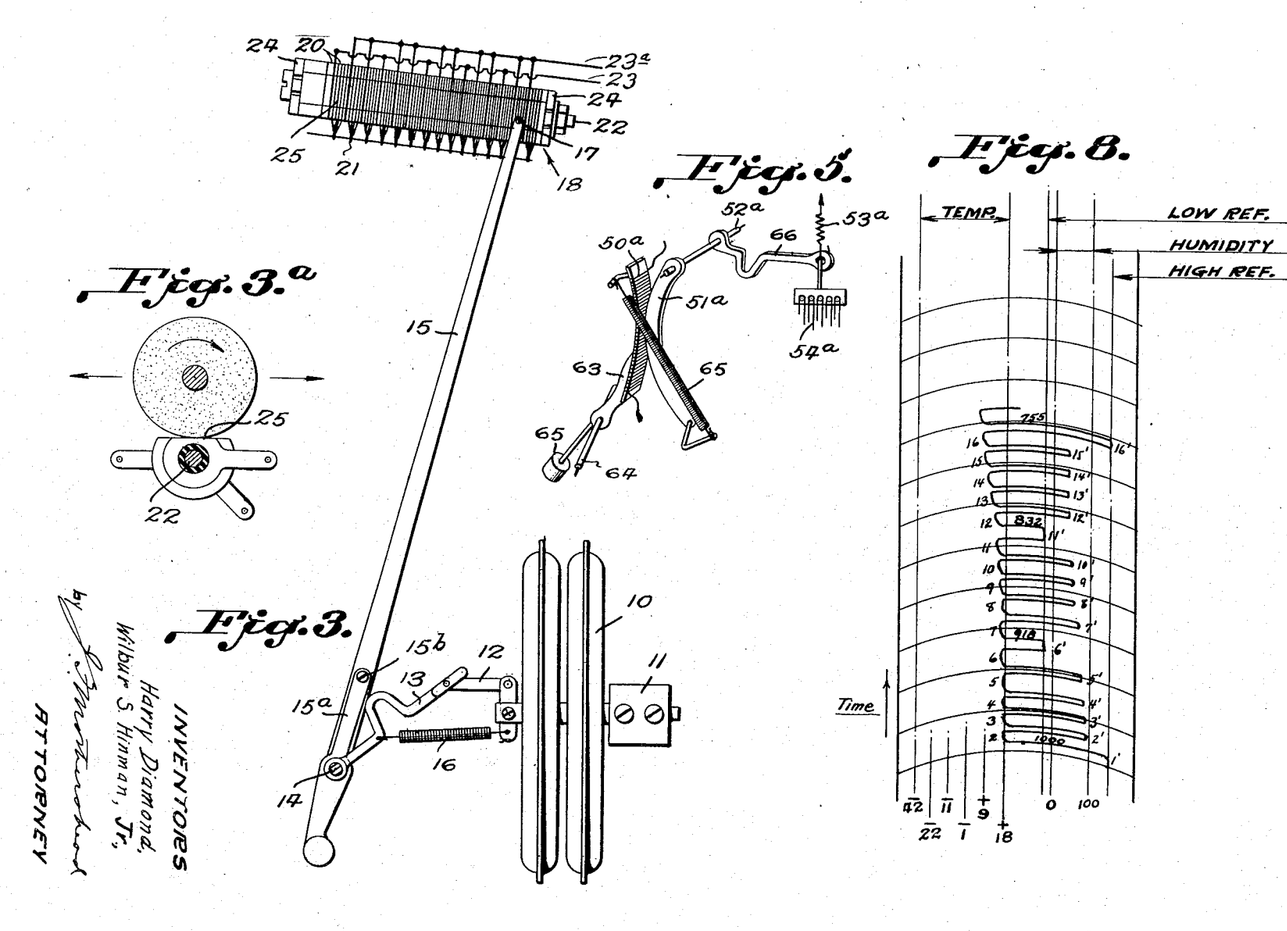
Fig. 3 illustrates a preferred form of pressure-responsive switching device.
Fig. 3a illustrates the preferred manner of forming and polishing the commutator switching segments therefor.
Fig. 5 illustrates a desirable form of humidity controlled resistor.
Fig. 8 is a partial chart of time, pressure and altitude plotted against modulation frequency indications of temperature, humidity and reference, illustrating a form of record obtainable by this invention.

An illustrative form of switching element is shown in Fig. 3. In this form the meteorological factor responsive device which operates the switching means comprises a pressure responsive means shown as an expansible bellows or Sylphon 10 adjustably mounted on a support 11 and connected by an adjustable link 12 to input arm 13 of a bell crank pivoted at 14 and having an output arm comprising a light lamination 15.

Slack takeup means is preferably provided, herein shown as a light tension spring 16 bridging the linkage interconnecting arm 13 and the Sylphon 10, arm 13 being offset as shown for clearance and to enable adjusting of its effective length by bending.

The light lamination 15 of the output arm carries a contact point 17 at its outer end, engaging the commutator or switching element 18. Means is preferably provided for adjusting the contact tension, herein shown as a heavy lamination 15a comprised in the output arm, provided with an adjustable set screw 15b threaded through it and engaged against the face of the light lamination.

The commutator means comprises alternate insulating segments 20 and conducting segments 21 suitably assembled, as for example, on a central rod or bolt 22, from which the conducting segments are electrically isolated. A particularly satisfactory embodiment which has been successfully used comprises conducting segments 0.003 inch thick, and insulating segments of Bakelite 0.015 inch thick. Double or triple segments 23, 23a are used for special purposes, as for index contacts, as desired.

After the insulating and the conducting segments, the latter preferably provided with soldering lugs, as shown, are assembled and rigidly clamped together, and preferably to a supporting base (arms 24 of a generally U-shaped supporting base are shown for illustration) a face 25, preferably flat, is formed on one side of the stacked segments, preferably by planing or milling, and polishing the same in a direction transverse to the axis of the commutator, as shown in Fig. 3a, so that no chipping or drawing over of the edges of the segments will occur, as might be the case if the forming operation were performed longitudinally of the commutator and thus from segment to segment.

In view of the extreme delicacy and sharpness of response desired, and of the weather conditions in which the instruments may be used, it is particularly desirable to reduce friction between the contact point and commutator and eliminate drag on the contact arm due to condensation of moisture on the commutator.

To this end many experiments with various materials have been resorted to and while combination No. 1 following has been relatively satisfactory, the best combinations have been found to be Nos. 2 and 3 following:

|  | Comb. #1 | Comb. #1 | Comb. #3 |
|---|---|---|---|
| Insulating segments. | Bakelite | Bakelite | Bakelite. |
| Conductive segments. | Coin silver | German silver | Beryllium copper. |
| Contact point | Platinum | Stainless steel | Phosphor bronze. |

The contact point 17 is of course smoothly rounded and polished to give a fine, smooth, rounded point.

Figures 4, 6, 7:
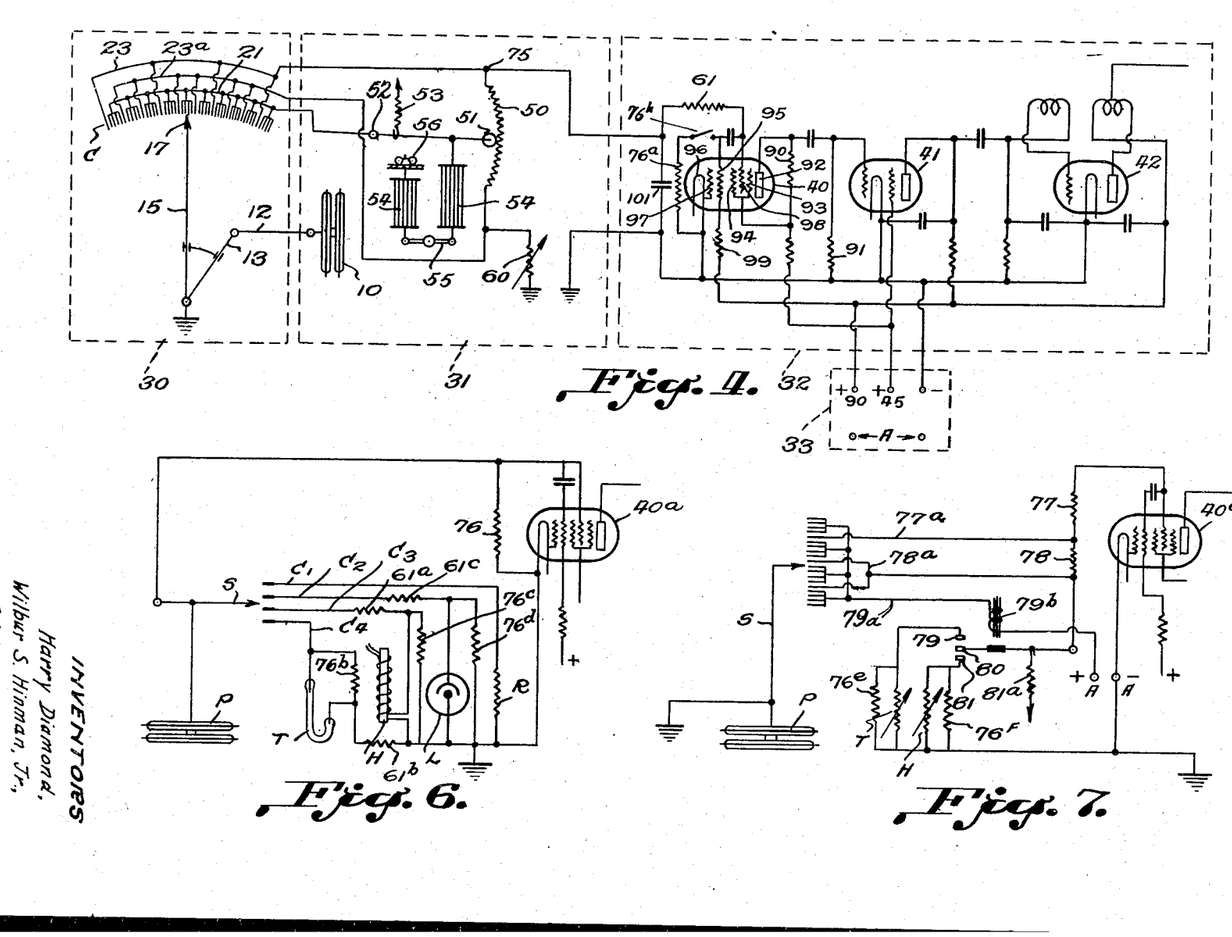
Fig. 4 shows diagrammatically one preferred embodiment of the balloon instrument.
Figs. 6 and 7 show diagrammatically modified arrangements of the balloon instruments.

*The method of pressure switching as embodied in the structure shown in Fig. 4*

The operation of the pressure switching method may be more fully understood by reference to Fig. 4, showing diagrammatically the switching unit 30, the factor responsive unit 31, the transmitter unit 32, and the battery unit 33.

These same units are generally indicated in Fig. 1, in which the partitions which may conveniently divide the balsa-wood box for separately housing them are indicated in dotted lines. As there shown, the several units may be mounted on balsa or other suitable panels 34, 35, insertable in the open faces of the compartments against suitable positioning strips or other positioning means, and secured therein by any suitable means, the "Cellophane" base non-drying adhesive tape 36 being particularly desirable because of its tenacity and light weight. In the form shown in Fig. 1, the pressure switching unit and pressure responsive device are mounted on the inside of the panel 35, which may be of aluminum and skeletonized to minimize weights and give free access of pressure to the device, while the other factor responsive devices are preferably located outside this panel 35. For example, in the form shown, the temperature and humidity responsive devices are located outside the panel 35, and protected from the sun or other undesirable influences by suitable means, as one or more light metal thermal shields 37. A plurality of such shields, spaced one within the other, will offer best insulations from the sun's heat. If a light responsive device is used, it is of course exposed to the light to be measured.

Again referring to Fig. 4, the transmitter 32 is preferably of the relaxation oscillator type, that shown comprising an audio-oscillator 40, an audio-amplifier 41, and an ultra-high frequency oscillator 42.

The elements of the pressure switching device 10—25, shown in Fig. 3, are similarly identified in Fig. 4, in which they are shown more diagrammatically.

The illustrative humidity responsive device shown therein comprises a resistance 50 and means for varying its effective value responsive to relative humidity. This means, as the illustrative form shows, comprises a rolling contactor 51 of any suitable form, moved about a pivot point 52 by the joint action of a light spring 53 and a hair hygrometer 54, shown as comprising two sections connected in series by bell-crank lever 55, and provided with tension and scale adjusting means shown as the adjusting nut 56. The rolling contact 51 thus moves from one end of the resistance scale 50 to the other as the relative humidity varies from 0 to 100 per cent.

The temperature responsive device indicated at 60 (Fig. 4) might be a similar resistor varied by a bimetallic strip, for example, but for the reasons stated above, preferably comprises an element inherently varying in resistance with change in temperature, as hereinafter described.

These two elements and the pressure responsive element 10, exemplify means responsive to any given factor for which data may be desired, and in the form shown, the indications are transmitted in the following manner:

Considering first the pressure and reference indications, as above mentioned, the pressure decreases substantially constantly with ascent. Thus the pressure responsive device 10 will move the arm 15, starting at atmospheric pressure at the earth's surface, continuously from one end of the commutator to the other, save for possible reversals due to down drafts. The continuity of motion, or reversal thereof, may easily be determined by the order of receipt of the several reference signals mentioned hereinafter. Now contact of the pressure arm with any given insulating or conducting segment of the commutator C corresponds to a definite pressure on the diaphragm 10 easily determined by initial calibration thereof. Thus, by identifying the particular segment contacted, an absolute pressure scale may be secured. The method and means of this invention accomplishes this in simple fashion by means of reference contacts corresponding to selected ones, as every fifth one, of the conducting segments, which may be arranged either of greater width than the others, as above mentioned, or to give a reference signal of predetermined modulation, or both, as in the preferred form herein shown. In this preferred form, when the pressure controlled contact 17 engages one of the reference contacts, say 23 (Figs. 3 and 4), a fixed resistance is included in the grid circuit of the oscillator tube 40, thereby producing a predetermined modulation frequency which is characteristic of that particular index segment. In the form of Fig. 4, this fixed resistance is the resistance 61, connected between the grid of tube 40 and contact 23, and the contact arm 15 connects segment 23 directly to the ground or cathode side of this grid circuit.

Similarly, to obtain a second predetermined reference modulation, contacts 23a may be employed, including a different, herein larger, fixed resistance in the grid circuit. For economy and lightness, in the form shown in Fig. 4, the total length of the resistor 50, part of which is used for humidity indication, is employed in series between resistor 61 and contacts 23a. Thus, with contact 17 resting on segment 23a, the grid circuit will pass from tube 40 through fixed resistors 61 and 50, to contact 23a and thence, by way of arm 15 to the cathode side of the grid circuit. Experience has shown that a combination of two such identifying frequencies together with varying widths of the index contacts is sufficient for positive identification of the portion of the pressure scale involved. Having established identification of the index contacts, contact of the pressure arm with any conducting strip lying intermediate to the index contacts may now be identified by the sequence of its occurrence with relation to the index contacts preceding and following it. The indication that a contact has occurred is provided; for example, by causing it to produce a change in frequency of the audio oscillator. The magnitude of the frequency change for these intermediate contacts, which may be used for indicating other meteorological factors, has no significance in the form shown as regards pressure indication. The occurrence of an incremental change of pressure is identified by the fact of making or breaking of contacts, which actions serve as pressure indications.

This method of securing a positive and absolute pressure scale affords the important advantage of freeing the intermediate contacts for use in switching between other factors such as temperature and humidity readings indicated on a frequency basis.

The humidity controlled resistance device 50—56, in Fig. 4, may conveniently be of the form shown in Fig. 5 if a hair-hygrometer means is to be employed. In this form resistor 50a is carried on a support 63, rockably carried on pivot shaft 64 and suitably counterbalanced as at 65, flexible connections to the ends of resistance 50a being used. The cam contactor 51a in the form shown in Fig. 5 is likewise rockably carried by a pivot shaft 52a in position to roll against resistor 50a, the two being held in contact by a light tension spring 65, and being preferably so curved that substantially no change in tension of spring 65 will occur as the parts roll from one extreme position to the other. The hair hygrometer 54a and cooperating spring 53a are connected to effect rocking of the parts 50a, 51a, in any suitable manner, as by connection thereof to an arm 66 turning the pivot shaft 52a. The wire of resistance 53a being bared at the zone of contact with roller 51a, it will be seen that the operation will be as diagrammatically indicated in Fig. 4.

The temperature-controlled resistance 60, in Fig. 4, may be of any suitable type. That preferred is one inherently varying resistance with change of temperature and may, as shown in Fig. 2, comprise a capillary tube 60a containing an electrolyte 60b varying inherently with temperature, for example, a sulfuric acid solution of 1.3 specific gravity (which allows temperature indication down to its freezing point, minus 70° centigrade, even in the absence of provisions to reduce the freezing point). The electrical connections to the capillary column of electrolyte are made in the form shown by electrodes 60c sealed into the enlarged ends 60d of the tube 60a, which may be of glass or other suitable material. The enlarged end walls 60d provide a large area, low resistance contact between the electrolyte and the electrodes 60c which may be of platinum wire. Suitable provisions are made to provide for expansion and collection of any minute gas bubbles formed in the event no other provisions are made to avoid electrolysis, such means in the form shown comprising an expansion chamber 60e. A device of this character entirely suitable for the intended purpose may be made extremely small, viz., a capillary tube length of 10 centimeters, capillary diameter of 0.5 millimeter and wall thickness of 0.5 millimeter are adequate, and to reduce space still further, the capillary tube may be bent into a coil if desired.

While the temperature controlled resistance may be similar to that shown for humidity control, for example, a mechanically variable resistor controlled through a linkage from a bimetallic strip, the capillary tube type just described offers many advantages in addition to eliminating mechanical parts and reducing weight. It responds very rapidly to temperature changes. For example, a sample tube taken out of a temperature chamber at −50° C. and exposed to still air at +20° C., changed in electrical resistivity from the value corresponding to −50° C. to the value corresponding to +10° C. in ten seconds, and to that of +18° C. in five seconds more.

The interconnection of these instruments in Fig. 4 is as follows:

The fixed resistor 61, the fixed total length of the hair-controlled resistor 50, and the variable resistor 60 formed by the temperature capillary tube (Fig. 2), are connected in series in the grid circuit of the audio oscillator.

Thus, when the contact point 17 rests on an insulating segment, the only variable resistance in the grid circuit of oscillator 40 is the temperature resistance 60, and the modulation frequency will be a function of the temperature.

As above mentioned contacts 23 are connected to short out resistances 60 and 50, leaving only fixed resistance 61 in the circuit, for reference purposes; while contacts 23a are connected to short out resistance 60, leaving only fixed resistances 50 and 61 in the circuit for further reference purposes. Thus, when contact point 17 rests on contact 23 a predetermined modulation frequency of reference will be transmitted; and when contact point 17 rests on contact 23a, a second fixed frequency of reference will be transmitted. Any slight drift in these fixed reference frequencies due to running down of batteries, it will be seen, will provide the necessary data for correction of scales for the meteorological factor-indicating frequencies. If desired, the identifying frequencies may be made to coincide exactly with the frequencies corresponding to 100 per cent and 0 per cent relative humidity by suitably arranging the hair element drive of the resistor 50 to provide for full travel of the contact point 51.

And finally, in the arrangement of Fig. 4, the intermediate contacts 21 are connected to short out the temperature resistor 60 and the lower part of the resistor 50, including in the grid circuit of the oscillator 40 only the fixed resistor 61 and such part of the resistor 50 as corresponds to the relative humidity indication. Thus, when the contact point 17 rests on an intermediate contact 21, a modulation frequency corresponding to the relative humidity will be transmitted.

The series connection of the several resistors as shown is particularly desirable because in this way any overlapping of scales in recording the data by means of a recording frequency meter may be most easily avoided. Thus, with the arrangement shown in Fig. 4 a chart such as indicated in Fig. 8 might be obtained, in which the beginning of the record is at the bottom, the record sheet is rolled from top to bottom under the pen, and the pen is swung arcuately crosswise of the sheet, from a lower frequency at the left-hand side to a higher frequency at the right-hand side of Fig. 8.

Now it will be seen that if the record is started with point 17 at the extreme right-hand contact 23 (Fig. 4), assuming this corresponds to the atmospheric pressure at the surface of the earth, then only fixed resistance 61 will be in the grid circuit and the high reference frequency modulation shown at the bottom of Fig. 8 will result.

As soon as the balloon ascends sufficiently so that the reduction in atmospheric pressure allows Sylphon 10 (Fig. 4) to expand sufficiently to move contact 17 to the first insulating segment, fixed resistances 61 and 50 and temperature resistor 60 will be in the grid circuit (Fig. 4) and the pen will move along line 1'—2 (Fig. 8) to the temperature indicating position at the left-hand end of this line.

The instrument having been calibrated with respect to the frequencies corresponding to given temperatures, the temperature scale may be drawn on the record as shown at the bottom of Fig. 8, where it will be seen that the first temperature indication, at the left-hand end of line 1'—2, corresponds to +17° C.

Then when the balloon has ascended enough to move contact 17 to the first intermediate contact 21, the pen will move along line 2—2' to a humidity indicating position, and the instrument having been calibrated for frequencies corresponding to given relative humidities, the percentage scale of relative humidity may be drawn on the record as shown at the bottom of Fig. 8, in which the first humidity indication, at the end of line 2—2', corresponds to 80% relative humidity.

As the balloon continues to ascend the pen will move, as shown in Fig. 8, as follows: At second insulating segment 20—along line 2'—3 to T—at second intermediate segment 21—along line 3—3' to H—at third insulating segment 20—along line 3'—4 to T—at third intermediate segment 21—along line 4—4' to H—at fourth insulating segment 20—along line 4'—5 to T—at fourth intermediate segment 21—along line 5—5' to H—at fifth insulating segment 20—along line 5'—6 to T—at low reference contact 23a—along line 6—6' to low reference—then for the next group of five insulating and four intermediate contacts, temperature and humidity indications will alternately be given at the ends of lines 6'—7 through lines 10'—11, followed by another low reference at the end of line 11—11', when point 17 moves on to the second low reference contact 23a. This will be followed again in the form shown by five temperature and four humidity indications given alternately, after which the pointer 17 will move to the second high reference contact 23 and the pen will move along line 16—16' (Fig. 8) to the high reference check frequency. As the balloon continues to ascend further indications will similarly be obtained, until the balloon breaks. The balloon instruments will then descend, partially sustained by a second balloon or a parachute. The record will show a reversal at the highest point, which may easily be located by the position of reference points before and after the break, and by the fact that the relatively rapid descent will speed up the record, bringing much closer together the lines of transfer from one functional indication to the other. This record will continue until the transmitter falls so far below the horizon as to cut off transmission of signals.

Thus, a series of temperature indicating and humidity indicating points will be obtained which may be connected, as by the respective dotted lines (Fig. 8) to show the curves of temperature and humidity as the balloon ascends. Now if the instrument is calibrated as to position of the contact point 17 on the segmental armature 18 with varying pressures, it will be apparent that the number of contacts passed over will be a measure of the pressure at any given reading. Thus, in Fig. 8, line 1'—2 shows the starting pressure of 1000 millibars, and the calibration of the instrument determines the pressure at each transfer line. Representative transfer pressures are shown in Fig. 8, for simplicity, only on every tenth transfer line (five pairs of lines after the first and thus a transfer from a reference frequency in each case), these pressures being, in the illustrative case, 918, 832 and 755 millibars, respectively.

Thus, the vertical axis of Fig. 8 is not only a time axis, but also a pressure axis and (as the time and pressure are related to rate of ascent) an altitude axis as well.

Also, the transverse abscissas of Fig. 8 are not only frequency abscissas, but by the calibration of the instrument, check reference abscissas and meteorological factor abscissas as well.

The direct reading provisions of this invention contemplate the design of the relaxation oscillator in such manner that the generated frequency for a given grid circuit impedance will remain virtually constant notwithstanding changes in the temperature and humidity, the "A" and "B" battery currents, and other factors. In such ideal case the calibrations of the instrument are obviously exactly adhered to and the record obtained will be direct reading for all factors.

In addition, the provision of high frequency and low frequency check-references enables the obtaining of correct records even with a transmitter less accurately designed, as any shift of these reference frequencies will denote the extent of correction of other abscissa indications needed, and as these references may be employed for prevention of cumulative error, by adjusting the recording frequency meter, by a rheostat for example, to change the scale of the meter on each departure of a check reference from standard, to bring this reference to the predetermined point on the scale, thus rendering the record direct-reading for all practical purposes.

In addition, as above mentioned, the two references may be made to coincide with the calibrated frequencies corresponding to 0% and 100% relative humidity (as generally representative of any predetermined factor scale limits), in which case the scale of humidity will be directly drawn upon the chart by the reference frequencies.

Ground station receiving equipment may be of any suitable form, but preferably, as above indicated, comprises a radio receiver operating a graphical audio-frequency recorder. By this preferred arrangement in automatic record is obtained on a chart. In the most preferred form, the data are directly plotted in the form generally desired by meteorologists; i. e., temperature and humidity as abscissas against pressure as ordinates.

Such an arrangement is generally indicated in Fig. 9, in which the signals transmitted from the balloon instruments are picked up by a radio receiver 10, preferably of the super-regenerative type, which feeds an electronic frequency meter 71, as through a suitable amplifier 72 capable of amplifying the range of indicating frequencies employed and preferably peaked at such range for the purpose of rejecting extraneous frequencies. Thus, with indicating frequencies of from 0 to 200 cycles per second, for example, this peaked amplifier 72 might act as an electrical filter blocking out frequencies much in excess of 200 cycles per second.

The electronic frequency meter 71 may operate to deliver a direct current to its indicating meter which may range from 0 to 500 microamperes, for example, as the indicating frequency varies from the illustrative 0 to 200 cycles per second. Now if a higher current, say for example 5 milliamperes, is required to produce full scale deflection of the pen of the recording milliammeter 73, the output of the electronic frequency meter 71 may be correspondingly amplified, as in the ratio of ten to one in the example assumed, by a suitable amplifier 74.

The complete setup is essentially a graphical audio-frequency recorder which converts the audio-frequency notes received in the radio receiver output into a record of the desired form.

Automatic operation is afforded by the receiving setup shown. In a large number of flight tests, no need has been experienced for retuning the radio receiver once the balloon transmitter leaves the ground. In the preferred receiving arrangement of Fig. 9 two separate automatic volume control features take care of the large variation in received voltage as the distance of the balloon transmitter from the receiving station increases. The first is inherent in the operation of the super-regenerative detector while the second is provided by the frequency meter which operates accurately for the range of input voltages employed, which may extend from 2 to 150 volts, for example.

The type of record obtained is indicated in Fig. 8, above described. Since points along the scale of abscissas on the chart represent specific values of audio frequency (say from 0 to 200 cycles per second), they may be interpreted directly in terms of the corresponding values of temperature and humidity. This is facilitated by marking the temperature and humidity scales on the chart, corresponding to the particular values of reference and factor scale frequencies used. The degree of any departure from a straight vertical line, of the indicated reference frequencies, determines the magnitude of corrections to be applied to any factor indicating frequencies for which no compensating scale change is made on the chart, on a proportional basis.

In addition to the indications above set forth, it will be appreciated that other data may be obtained. Thus, from computations based on the net change in altitude between any two contacts divided by the time interval between the occurrence of the contacts, as shown in Fig. 8, the rate of ascent or of descent may be determined. From this data indicated vertical wind velocities may be measured.

One advantage of the radio meteorograph described lies in the ease of calibration of its component units. Each of the three units may be calibrated independently.

To calibrate the pressure unit, a resistor of convenient value may be substituted in the meteorograph Fig. 4 for the capillary tube 60.

Conveniently, the meteorograph unit is placed in a pressure chamber and an ohmmeter is connected between the upper end of the humidity resistor and ground (see Fig. 4). As the pressure chamber is evacuated, the ohmmeter will indicate the switching operations performed by the pressure arm. As the pressure arm passes over the index contacts, the ohmmeter will read either zero resistance corresponding to one set of index contacts or the total value of the humidity resistor corresponding to the second set. For intermediate contacts, the ohmmeter will read the value of a portion of the humidity resistor depending on the humidity conditions in the pressure chamber. Between contacts the ohmmeter will show the value of the humidity resistor plus the resistor substituted for the temperature device. For each contact, the value of the pressure is recorded corresponding to the instant of breaking or making the contact. A complete calibration of the pressure unit can be carried out in ten to fifteen minutes. In calibration of a number of such units, the indicated accuracy appears to within less than one millibar.

Calibration of the humidity device may be accomplished by placing the meteorograph in a humidity chamber and measuring the resistance between points 75 and 51 (Fig. 4) corresponding to varying values of relative humidity. These resistance readings may be readily converted to the corresponding values of frequency generated by the audio oscillator from the reciprocal resistance relation of the oscillator.

Calibration of the temperature device may readily be effected by placing it in a temperature chamber and connecting it electrically in the grid circuit of a test audio oscillator. Its resistance at a given temperature may be measured by measuring the audio-frequency generated and substituting for it a standard variable resistor which is adjusted to produce the same generated frequency. The same test provides data for plotting the audio-frequency as a function of temperature. However, if this graph is to be used in interpreting a flight record, care must be taken that a given fixed resistance in the grid circuits of the test and flight audio oscillators produces the same generated audio frequency. Close matching of component parts of the audio oscillators is contemplated to fulfill this condition. Departure from exact equivalence of the generated frequencies may be corrected for on a proportional basis. The identifying frequencies of the system provide the means for making this correction.

The pressure scale may be made approximately linear with either pressure or altitude by design of the pressure arm linkage. The linear pressure scale is employed in the embodiment shown, since it affords a greater number of readings at the lower altitudes for a given number of contact segments in the pressure-switching element. In one embodiment of switching element, 75 contact segments have been used. This provides pressure (and also humidity) readings at increments in the altitude of less than 500 feet during the first 15,000 feet of an ascent. These increments may be further reduced, if desired, by increasing the number of segments in the switching element. In any case the temperature readings are continuous between contacts, occurring for five-sixths of the time in the form shown. Thus, for the embodiment described, temperature indication is obtained continuously during 415 feet of each 500 feet increment in altitude up to 15,000 feet.

Illustrative modifications

As illustrative of the many variations of method and means which may be made without departure from the broader aspects of our invention, modified general arrangements and elements are shown in Figs. 6 and 7.

Thus in Fig. 6, the pressure responsive device P controls the switch arm S, which is shown directly connected to the grid of the relaxation oscillator 40a. The factor-varied resistances in this case are shown as alternatively connected across the grid circuit by the switch S, as it contacts the commutator segments of circuits $C_1$, $C_2$, $C_3$, $C_4$, respectively. For simplicity only one contact for each circuit is shown, although in practice these would be multiplied as above described in connection with Figs. 3 and 4. When switch S is on an insulating segment the reference frequency determined by the path through shunt resistance 76 will obtain, and when on contact $C_1$, the reference frequency for the parallel paths through 76 and R will be generated. The factor-responsive resistances are shown diagrammatically in this figure as resistances variable inherently with temperature, humidity, and light-intensity, respectively designated T, H, and L.

As the reference resistor 76, Fig. 6, parallels or is a shunt resistor with reference to the factor resistances T, H, L and R, it will be appreciated that 76 will be the low frequency reference resistor, and, in the arrangement shown, will establish the low limit of frequency of the transmitter. A similar shunt resistance 76a may be used in the circuit of Fig. 4, where switch 76h is shown adapted to introduce such shunt resistance into the circuit. With this switch closed, shunt resistance 76a will establish the low limit of audio oscillation frequency, while series resistance 61 will establish the high limit thereof. Thus appropriate adjustment of these two resistances may be made to adjust the frequency range to correspond to the entire recording range available to make most effective use of the equipment. Similar, but local, series resistances 61a, 61b and 61c may be used as shown in Fig. 6, to adjust the upper frequency limits of the factor variable resistances H, T, and L, individually; and similar, but local, shunt resistances 76b, 76c and 76d (Fig. 6) and 76e and 76f (Fig. 7) may be used to adjust the lower frequency limits of the respective factor responsive variable resistances employed.

A further modification, shown in Fig. 10, may be desirable when an increased number of factors are to be measured. As the number of contact and insulating segments of the switching element 18 (Fig. 3) cannot be indefinitely increased, it will be appreciated that with the simple arrangements shown in Figs. 4, 6 and 7, if the number of factors are increased, the number of readings per centibar for each factor will be decreased.

The object of the arrangement of Fig. 10 is to avoid this difficulty by obtaining readings of more than one factor for each contact or insulating segment. As therein shown, the circuit may be provided with high and low frequency limiting resistors 61d and 76g; the groups of contact segments of the switching commutator 18 may be connected to provide two reference frequencies by inclusion in the circuit of one or both of the series resistors 61d and 61e, and an auxiliary switching means 100 may be provided to serially connect in the circuit a plurality of factor responsive elements associated therewith, during the periods when contact 17 moved by pressure diaphragm 10 rests on the insulating segments of switching element 18.

This auxiliary switching means 100 may comprise, as shown for purposes of illustration, a relatively rapidly driven multi-contact switch operated by any usual or special motor means, such as a stored power operated escapement or any other motor driven commutator or switching means.

Again, in Fig. 7, for example, the solenoid operated relay 79—81, shown controlling two contacts for simplicity, may be a dashpot controlled or other slow acting relay moving a contact point over three or more contacts for three or more factors, either spring returned as shown or of the two coil reversing type if desired. This will provide the serial auxiliary switching during a period when the switch arm S rests on a conductive segment, and under control of the establishment of the circuit thereby, while the arrangement of Fig. 10 provides for continuous switching of the auxiliary device, and connection thereof in the oscillator control circuit when the pressure switching element rests on an insulating segment.

In the illustrative form shown in Fig. 7, the high reference is obtained when switch S is moved by pressure responsive device P to connect with circuit 77a, including only resistance 77 in the grid circuit of the relaxation oscillator. The low reference is generated when switch S is moved to contact circuit 78a, including resistances 77 and 78 in the grid circuit. The temperature controlled frequency is set up when switch S contacts circuit 79a. This energizes solenoid coil 79b from the "A" current supply in the form shown, closing relay switch 80 on switch point 79, thus including fixed resistors 77 and 78 and temperature-variable resistor T in the circuit. When switch S rests on an insulating segment in the form shown, relay contact 80 is held against contact 81 by spring 81a, so that the two fixed resistors 77, 78 and the humidity variable resistor H are connected in the grid circuit, making the frequency modulation responsive to relative humidity.

It will be seen from the foregoing description that in the case of Fig. 4, the series arrangement of reference, humidity, reference, and temperature indications provides separate, non-overlapping frequency ranges therefor in a most simple manner, each fixed or fixable resistance being used both for its own function and for the purpose of displacing the frequency scale for the next factor to a non-overlapping position.

This desirable provision is carried forward in Fig. 6 with respect to the permanent inclusion of reference resistor circuit 76; and in Fig. 7 with respect to reference resistors 77 and 78; but the factor responsive resistances in these modifications are connected alternatively. An advantage of this latter arrangement is that the scales for the respective factor-indications may each extend over a major portion of the total frequency range employed. A disadvantage is the fact that with such extension overlapping of frequency scales renders the record obtained less readily read. The resistance ranges of the several factor responsive devices in Figs. 6 and 7 may be made such that no overlapping of ranges obtains even without serial connection thereof, so long as the weight of the balloon instrument is not unduly increased, but the advantage of the serial connections, where practicable, will be appreciated.

Adaptability for measuring upper air wind conditions

One particular difficulty with all prior radio-meteorological devices known to us has rested in the discontinuous and varied radio frequency signals thereof, which for all practical purposes could not be received by direction finding equipment to enable determination of wind direction and velocity.

Aside from the ability of the present invention to provide meteorological observations at much greater heights than by airplane ascents, at greater rates of ascent than other radiometeorographs, at less time for a complete record, and thus with reduced battery requirements, with good ventilation of the thermal shield, and with better possibility of recovery of the instrument, particularly in near-coastal regions, it affords the opportunity of using radio direction finding methods for tracking the path of the balloon, thereby giving data on the upper-air wind conditions.

To evaluate upper-air wind velocities, it is necessary to measure continuously the distance and azimuthal direction of the balloon from the ground station. The vertical wind velocities, as above mentioned, are readily determinable from the pressure-time relations of the flight of the balloon. The present invention, in its preferred embodiment, generates a continuous radio-frequency signal cyclically varied as to modulation. This signal may thus be continuously received by suitable direction finding means at one or more ground stations.

A preferred new method of three-dimensional directional finding usable in this connection forms the subject matter of a joint invention of the present applicants with F. W. Dunmore, and, accordingly, is not claimed in the present case. Such method, however, is described in one or more of the following articles descriptive of the present invention, to which reference is hereby made, and which also set forth in detail technical data, the results of actual ascension records, and other details to which reference may be had to supplement the foregoing description, if desired:

H. Diamond, W. S. Hinman, Jr., and F. W. Dunmore—"The Development of a Radio-Meteorograph System for the Navy Department"—Bulletin American Meteorological Society—March, 1937—pages 73–100.

H. Diamond, W. S. Hinman, Jr., and F. W. Dunmore—"A Radio Meteorograph System with Special Aeronautical Applications"—Journal of the Aeronautical Sciences—vol. 4—No. 6—April, 1937—pages 241–248.

H. Diamond, W. S. Hinman, Jr., and F. W. Dunmore—"A Method for the Investigation of Upper Air Phenomena with Special Application to Radio-Meteorography"—Journal of Research of the N. B. S.—March, 1938, vol. 20—No. 3—page 369—Research Paper 1082.

See also the following reports of disclosures of a part of the present invention to others, also all within two years prior to the filing of this application, and in which credit is given to applicants by such others:

W. W. Coblentz and R. Stair—Journal of Research of the N. B. S.—vol. 20—No. 2—February, 1938—pages 185 through 215—Research Paper 1075.

W. W. Coblentz and R. Stair—Journal of Research of the N. B. S.—vol. 17—No. 1—Research paper 899.

W. W. Coblentz and R. Stair—Bulletin of the American Meteorological Society—vol. 18—No. 11—November, 1937—pages 345–352.

As above mentioned, in its broader aspects, the present invention may employ any known or special type of oscillator, the type shown being preferred because of its low power requirements.

To further stabilize the frequency of the audio oscillator against changes in "A" and "B" battery potentials due to draining of such batteries, the circuit of the audio oscillator 40 is preferably modified to include, in addition to the other elements, a resistance 90, 91 in series with its plate 92 and a screen-like grid 93 (94) intermediate the grid-like anode 95 and the plate-like anode 92. With a type 1A6 tube resistance 90, 91 of 25,000 and 10,000 ohms, respectively, have been found satisfactory. In the form shown the anode grid 95 is highly positively biased with respect to the cathode 96 and cathode grid 97, and capacity coupled to the control or suppressor grid 98. The anode-grid impedance which may be in the form of a 50,000 ohm resistance 99, provides for voltage swing proportional to the current on this grid, frequency control in the form shown being effected by the variable combination of leak resistances 61, 50, 60. It will be noted that in the form employed it is contemplated as desirable to use the plate 92 as the output circuit, and avoid disturbance of conditions effecting the cathode-control grid-anode grid relationships which might occur were the conventional output arrangement from the anode-grid circuit employed.

From the foregoing detailed description and the articles to which reference has been made, it will be seen that various modifications, adaptations, and applications may be made without departing from the scope of the present invention.

We claim:

1. Means for transmitting meteorological information and like factors, as from an unmanned balloon, comprising means for transmitting a carrier wave, means for applying to said carrier wave modulations characteristic of the respective factors to the transmitted, means for varying the modulations applied thereby in accordance with variations in said respective factors, and barometric pressure responsive means for affecting said applications serially in response to definite incremental changes in barometric pressure.

2. Means for transmitting meteorological information and like factors, as from an unmanned balloon, comprising means for transmitting a carrier wave, means for applying to said carrier wave modulations characteristic of the respective factors to be transmitted, means for varying the modulations applied thereby in accordance with variations in said respective factors, and means responsive to another of said variable factors for affecting said application serially in response to definite incremental changes of said other factor.

3. A radiometeorological transmitter according to claim 2, in which at least one of said factors is a fixed reference factor so that the means for varying modulations in accordance with said factor imparts a calibrating modulation to said carrier wave.

4. A radiometeorological transmitter according to claim 2, in which two of said factors are fixed reference factors so that the means for varying modulations in accordance with said two factors imparts two modulations to said carrier wave enabling calibration check of the meteorological factor controlled modulations.

5. Means for transmitting meteorological information and like factors, as from an unmanned balloon, comprising means transmitting a carrier wave, means applying to said carrier wave modulation frequencies in bands characteristic of respective factors to be transmitted, factor responsive means for varying said modulation frequencies within their respective bands in accordance with variations in the respective factors, and barometric pressure responsive means affecting said applications serially in a predetermined order in response to definite incremental changes of barometric pressure.

6. Means for transmitting meteorological information and like factors, as from an unmanned balloon, comprising means for transmitting a carrier wave, means for applying to said carrier wave modulation frequencies within bands characteristic of the respective factors to be transmitted and variable within their respective bands in accordance with variations of said factors, and means controlled by variation of barometric pressure for affecting said applications serially in a predetermined order.

7. Means for transmitting meteorological information, as from an unmanned balloon, which comprises means for transmitting a radio frequency signal, means for dividing into predetermined increments a meteorological factor of relatively unidirectional variance of which observed pressure is respresentative, means for modulating said signal during selected ones of said increments in accordance with at least one meteorological factor, and means for modulating said signal during other selected ones of said increments in accordance with another factor, said increments and the factor indicating modulations associated therewith being arranged in such manner that their relative associations serve to identify the particular increments.

8. In a system for transmitting meteorological information, as from an unmanned balloon equipped with a radio transmitter, a balloon instrument comprising means for transmitting a carrier wave, adjustable means for modulating said carrier wave, and means for varying the adjustment of said modulating means comprising resistances, some of said resistances variable in response to meteorological conditions, and barometric pressure responsive means for switching said several resistances into and out of adjusting relation to said modulating means.

9. In radiometeorography means for recording a plurality of meteorological factors which comprises means for translating certain of said factors into values in an electrical frequency scale, means for plotting said frequency values as coordinates against a time axis, and means for interleaving the translations of said factors in a manner predetermined by the occurrence of incremental changes in barometric pressure, whereby a chart of the values corresponding to said factors is directly plotted against a pressure scale delineated along the time axis by the shifts between factor translations.

10. In radiometeorography means for recording a plurality of meteorological factors which comprises means for translating certain of said factors into radiant energy characteristics, means for plotting said translated characteristics as coordinates against a time axis, and means for interleaving the translations of said factors in a manner predetermined by the occurrence of incremental changes in a coexistent meteorological factor, whereby a chart of the characteristics corresponding to said factors is directly plotted against a coexistent factor scale delineated along the time axis by the shifts between factor translations.

11. A radiometeorological transmitter comprising a carrier wave transmitter, means for variously modulating said carrier wave, said means including a circuit and elements connectable therein responsive to respective meteorological factors and correspondingly controlling the modulation characteristics of said modulating means, and means for successively connecting said elements in said circuit in response to incremental changes in barometric pressure.

12. A radiometeorological transmitter comprising a carrier wave transmitter, means for variously modulating the carrier wave thereof, said means including a series modulation control circuit comprising a fixed resistance, a second fixed resistance having a variable contact and means for varying the adjustment of said contact in accordance with a meteorological factor, and a third resistance variable in accordance with a second meteorological factor, pressure responsive means, and means controlled by said pressure responsive means for shorting out of said series circuit at predetermined barometric pressures said third resistance, said third and second resistances, and said third and the variable residual part of said second resistance, selectively.

13. A radiometeorological balloon instrument comprising means for transmitting a definite predetermined carrier wave, a relaxation oscillator for modulating said carrier wave, said relaxation oscillator including a circuit the resistance of which controls the frequency of its imparted modulations, a variable resistance means responsive to a meteorological factor, and means for periodically switching said variable resistance into and out of said circuit in response to incremental changes in barometric pressure.

14. A radiometeorological balloon instrument comprising means for transmitting a definite predetermined carrier wave, a relaxation oscillator for modulating said carrier wave, said relaxation oscillator including a circuit the resistance of which controls the frequency of its imparted modulations, two variable resistance means each responsive to a meteorological factor, and means for periodically switching said means into and out of said circuit in response to incremental changes in barometric pressure so that the imparted modulations will alternately be controlled by the variations of each of said variable resistances.

15. A radiometeorological balloon instrument comprising means transmitting a definite carrier wave, means for indicating barometric pressure by changing the modulation characteristic of said carrier responsive to incremental changes in barometric pressure, and means responsive to each of at least two factors of the group consisting of temperature, humidity, light intensity and reference value, for imparting corresponding characteristics to the modulations between various barometric pressure indicating changes.

16. A radiometeorological balloon instrument comprising a relaxation oscillator circuit controlled selectively by at least one of a plurality of resistances, and means for switching into said circuit various controlling resistances selectively in response to incremental changes in barometric pressure.

17. Means for modulating a carrier wave to transmit meteorological information, comprising means for serially applying to said carrier wave modulations characteristic of respective ones of a group of factors including meteorological factors, and means for interrupting said applications periodically to interpose a modulation characteristic indicating the occurrence of a definite increment of at least one factor independent of said group.

18. Means for modulating a carrier wave to transmit meteorological information, comprising means for serially applying to said carrier wave modulations characteristic of respective ones of a group of factors including meteorological factors and means for interrupting said applications periodically to interpose a modulation characteristic indicating the occurrence of a definite increment of barometric pressure.

19. In a radiometeorological transmitter, means for transmitting a definite carrier wave, means for applying to said carrier wave modulations characteristic of respective groups of factors to be transmitted, and means for effecting the applications of said groups serially, responsive to definite incremental changes in barometric pressure.

20. In a radiometeorological transmitter, an oscillator controlled in characteristics by values of resistance in its grid circuit, a fixed series resistance and a fixed shunt resistance in said grid circuit determining the range of characteristics of said oscillator, a control circuit including a group of factor responsive resistances and means serially switching the same into said control circuit, and means responsive to barometric pressure for shunting said control circuit across and disconnecting it from said shunt resistance.

21. In a radiometeorograph, means for generating a carrier signal, modulator means for applying thereto a resistance varied modulation signal, a temperature variable resistance device and switching means responsive to increments of change of atmospheric pressure for intermittently connecting said resistance device in controlling relation to said modulator.

HARRY DIAMOND.
WILBUR S. HINMAN, Jr.